United States Patent [19]  
Sygnator

[11] 3,720,251  
[45] March 13, 1973

[54] SHEET METAL NUT
[75] Inventor: Henry A. Sygnator, Chicago, Ill.
[73] Assignee: Illinois Tool Works Inc., Chicago, Ill.
[22] Filed: Sept. 7, 1971
[21] Appl. No.: 178,196

[52] U.S. Cl. ............................................. 151/21 R
[51] Int. Cl. ............................................. F16b 39/28
[58] Field of Search..151/21 R, 21 B; 10/86 R, 86 A; 85/32 R

[56] References Cited

UNITED STATES PATENTS

| | | | |
|---|---|---|---|
| 899,368 | 9/1908 | Winter et al. | 10/86 R |
| 2,443,066 | 6/1948 | Breedlove | 151/21 B |
| 2,716,434 | 8/1955 | Crowthen | 151/21 B |
| 2,410,995 | 11/1946 | Olson | 151/21 R |
| 2,758,627 | 8/1956 | Randall | 151/21 C |
| 2,287,691 | 6/1942 | Marchov | 10/86 A |
| 1,516,721 | 11/1924 | Emery | 151/21 B |
| 2,347,853 | 5/1944 | Thompson | 10/86 A |

Primary Examiner—Edward C. Allen  
Attorney—Robert W. Beart et al.

[57] ABSTRACT

The present invention relates generally to improvements in sheet metal nut members and particularly to sheet metal nut members in which the opposite end faces thereof are adapted to accommodate a screw member. The nut member disclosed herein is of one-piece construction and is adapted to be stamped and formed from a single piece of sheet metal stock. Axially aligned and spaced end plate sections are separated by side plate sections which provide a plurality of adjacently positioned external wrench accommodating nut surfaces. Internally threaded aligned annular extrusions extend axially inwardly from each end plate section.

6 Claims, 8 Drawing Figures

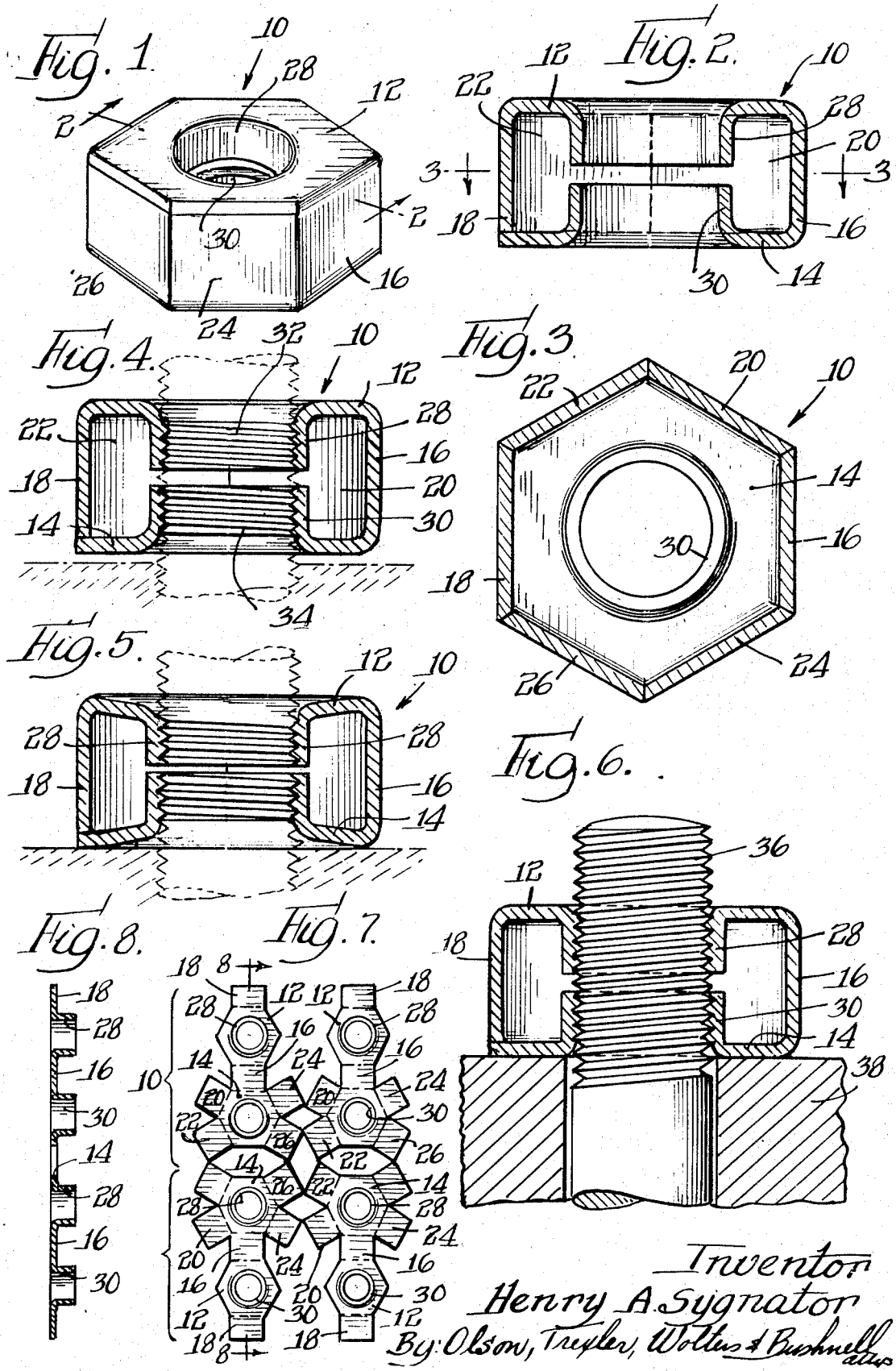

SHEET METAL NUT

SUMMARY OF THE INVENTION

Commercially available sheet metal nut members with which applicant is acquainted present certain structural and functional deficiencies which the present invention seeks to overcome. Conventional solid nut members usually permit a "two way" application, namely the application of either end surface of the nut member to a complementary screw member. It has not been common practice heretofore to provide sheet metal type nut members which are capable of the above mentioned two-way application. Also, it has not been common practice heretofore to provide sheet metal nut members of the above mentioned "two way" type wherein an unbroken nut periphery provides a plurality of adjacent wrench accommodating sides affording the external appearance of a solid nut member. It is therefore one of the important objects of the present invention to provide a novel sheet metal nut member in which either of the opposite end surfaces may be applied with equal facility to a complementary screw member.

It is a further object of the present invention to provide an improved nut member of the above mentioned type which may be produced from a single sheet of metallic stock.

The present invention also contemplates the provision of a sheet metal nut member as set forth above in which the thread convolutions thereof are adapted to aggressively impinge the thread convolutions of a complementary screw member.

It is a further object of the present invention to provide a sheet metal nut which may be produced by the practice of relatively simple stamping and forming methods, thereby assuring relatively low manufacturing costs.

Another object of the present invention is to provide a sheet metal nut member which presents an external appearance corresponding with that of a conventional solid nut.

BRIEF DESCRIPTION OF THE DRAWING

The foregoing and other objects and advantages will be more apparent from the drawing wherein FIG. 1 is a perspective view of a sheet metal nut which is representative of one embodiment of the present invention;

FIG. 2 is a central vertical sectional view taken substantially along the line 2—2 of FIG. 1, said view disclosing the axial extrusions prior to forming threads therein;

FIG. 3 is a horizontal sectional view taken substantially along the line 3—3 of FIG. 2;

FIG. 4 is a sectional view similar to FIG. 2 illustrating thread convolutions formed in the extrusions projecting axially inwardly from opposed end sections of the nut;

FIG. 5 is a view similar to FIG. 4 after the end sections have been flexed toward each other so as to effect misalignment of the thread convolutions in said extrusions;

FIG. 6 discloses the nut member applied to the complementary screw member and tightened against the surface of the workpiece;

FIG. 7 is a plan view of the stamped and extruded sheet metal stock prior to the final forming or bending operation; and FIG. 8 is a sectional view taken substantially along the line 8—8 of FIG. 7.

DESCRIPTION OF A PREFERRED EMBODIMENT OF THE INVENTION

Referring now to the drawing wherein like numerals have been employed to designate similar parts throughout the various figures, it will be seen that a sheet metal nut member representative of one embodiment of the present invention is designated generally by the numeral 10. The nut 10 includes end sections or faces 12 and 14 integrally joined by a side section 16. A tab 18 extends from the margin of the end plate or section 12 and is bent at ninety degrees to form a second side wall of the nut diametrically opposed to the previously mentioned side section 16. Four additional tabs 20, 22, 24 and 26 are bent at right angles to the end sections 14 to complete a total of six wrench accommodating walls of the nut 10.

The previously described end sections and side walls are initially in the form of a series of sheet metal stampings shown in FIGS. 7 and 8. The central area of the end sections 12 and 14 are formed respectively with axially aligned extrusions 28 and 30. While the adjacent edges of the extrusions 28 and 30 are separated from each other as shown in FIG. 2, said extrusions are formed with helically aligned thread convolutions 32 and 34, respectively. The end sections or plates 12 and 14 are then flexed toward each other to occupy the relative positions illustrated in FIG. 5. This axial deflection of the end sections 12 and 14 reduces the degree of separation of the extrusions 28 and 30, resulting in a slight helical misalignment of the thread convolutions 32 and 34. Hence, when the nut 10 is applied to a complementary screw member 36 (FIG. 6) and tightened against a workpiece 38, the thread convolutions 32 and 34 of the extrusions 28 and 30 will automatically become helically realigned, thereby causing resilient impingement of said thread convolutions against the complementary thread convolutions of the screw member 36. This impingement functions to resist unauthorized or unintentioned retrograde rotation of the nut 10.

From the foregoing it will be apparent that the present invention contemplates the provision of a sheet metal nut which to all intents and purposes as well as appearance, functions as a solid nut, and in addition incorporates the self-locking feature resulting from the increase in yieldable thread impingement as above described. It will also be understood that sheet metal nuts contemplated by the present invention may be produced by the practice of stamping, forming and tapping methods in such a manner as to reduce manufacturing costs to a minimum. The strip of sheet metal may be sent through a progressive stamping and forming machine in such a manner as to reduce the amount of resulting scrap. In this connection, particular attention is directed to the illustrations of stampings in FIG. 7. By having the end section 12 abut the adjacent margins of the tabs or side wall sections 18 through 26 inclusive the nut will withstand relatively high clamping forces.

The invention is claimed as follows:

1. A one-piece sheet metal nut member of the type in which either end face thereof is adapted to accommodate a screw member, said nut including axially aligned and spaced end plate sections, a wrench accommodating side section extending axially between and integrally connecting a pair of aligned superimposed margins of said end plate sections, wrench accommodating side sections extending between the remaining superimposed aligned marginal portions of said end plate sections whereby to provide a complete series of external wrench accommodating nut surfaces, and axially aligned internally threaded annular extrusions extending axially inwardly from each end plate section, both end plate sections being axially deflected toward each other to helically misalign the thread convolutions of said extrusions before application of the nut to a complementary screw member.

2. A one-piece sheet metal nut member as set forth in claim 1 wherein said end sections are hexagonal in shape, and the side wall sections cooperate to present a hexagonal nut periphery.

3. A one-piece sheet metal nut member as set forth in claim 1 wherein said integrally connected side section and the remaining side sections are in flush engagement along their adjacent margins so as to afford the appearance of a conventional solid nut member.

4. A one-piece sheet metal nut member as set forth in claim 1 wherein one of the side sections is diametrically disposed with respect to said integral side section, and the remaining side sections coact therewith to provide an uninterrupted series of side wall wrench accommodating surfaces.

5. A one-piece sheet metal nut member as set forth in claim 1 wherein the thread convolutions in the extrusions are such as to enable the application of either apertured end plate section to a complementary screw member.

6. A one-piece sheet metal nut member as set forth in claim 1 wherein each of the side sections extending between the remaining aligned marginal plate portions are integrally joined along one edge with a complementary marginal plate portion, the opposite edge of each of said side sections being disposed in abutting relation with the inner surface of the other end plate section.

* * * * *